(12) United States Patent
Hong et al.

(10) Patent No.: US 10,201,797 B2
(45) Date of Patent: Feb. 12, 2019

(54) REACTION DEVICE FOR MIXING AND MANUFACTURING METHOD USING THE REACTION DEVICE

(71) Applicant: LAMINAR CO., LTD, Seongnam-si, Gyeonggi-Do (KR)

(72) Inventors: Jong Pal Hong, Seoul (KR); Hee Wan Lee, Seongnam-si (KR); Gyeong Rye Choi, Seongnam-si (KR); Joong Won Lee, Seongnam-si (KR); Ho Jeong Chae, Daejun (KR)

(73) Assignees: LAMINAR CO., LTD., Seongnam-si (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 448 days.

(21) Appl. No.: 14/434,665

(22) PCT Filed: Nov. 21, 2013

(86) PCT No.: PCT/KR2013/010605
§ 371 (c)(1),
(2) Date: Apr. 9, 2015

(87) PCT Pub. No.: WO2014/084547
PCT Pub. Date: Jun. 5, 2014

(65) Prior Publication Data
US 2015/0258524 A1 Sep. 17, 2015

(30) Foreign Application Priority Data

Nov. 27, 2012 (KR) .................. 10-2012-0134923
Dec. 28, 2012 (KR) .................. 10-2022-0156969

(51) Int. Cl.
*B01J 19/00* (2006.01)
*B01J 19/18* (2006.01)
(Continued)

(52) U.S. Cl.
CPC ............. *B01J 19/18* (2013.01); *B01F 3/1207* (2013.01); *B01F 7/008* (2013.01);
(Continued)

(58) Field of Classification Search
CPC ............. B01F 15/0462; B01F 15/00396; B01F 3/1207; B01F 7/008; B01F 15/0248;
(Continued)

(56) References Cited

U.S. PATENT DOCUMENTS

| | | | |
|---|---|---|---|
| 4,846,584 A | * | 7/1989 | Burch .................. B01J 19/0013 374/31 |
| 2003/0137895 A1 | * | 7/2003 | Hummer ............... B01F 5/0218 366/137 |
| 2004/0126273 A1 | | 7/2004 | Forney et al. |

FOREIGN PATENT DOCUMENTS

| | | |
|---|---|---|
| JP | 06-287005 A | 10/1994 |
| JP | 08-047620 A | 2/1996 |
| KR | 10-1092337 B1 | 12/2011 |

* cited by examiner

*Primary Examiner* — Anshu Bhatia
(74) *Attorney, Agent, or Firm* — Im IP Law; C. Andrew Im; Chai Im

(57) ABSTRACT

A reaction apparatus includes first and second reaction material accommodation parts, each of which accommodates a solid, gaseous, or liquid reaction material. A feed pump feeds the reaction material to one or each of the first and second accommodation parts. A reactor mixes the reaction material fed from the feed pump. The reactor is configured to have a cylinder that has a reaction chamber which accommodates the reaction material therein. The reactor has injection ports on which one side of each of the upper portion and lower portion thereof are connected to the first and second reaction material accommodation parts, respectively. A stirring shaft is disposed to be rotatable in the cylinder and stirs the reaction material supplied from the (Continued)

first and second reaction material accommodation parts. A stirring motor provides torque for the stirring shaft.

8 Claims, 6 Drawing Sheets

(51) Int. Cl.
| | |
|---|---|
| *B01F 7/00* | (2006.01) |
| *B01F 15/06* | (2006.01) |
| *B01F 3/12* | (2006.01) |
| *B01F 15/00* | (2006.01) |
| *B01F 15/02* | (2006.01) |
| *B01F 15/04* | (2006.01) |
| *C01G 53/00* | (2006.01) |
| *B01J 8/10* | (2006.01) |
| *H01M 4/505* | (2010.01) |
| *H01M 4/525* | (2010.01) |

(52) U.S. Cl.
CPC ...... *B01F 15/00396* (2013.01); *B01F 15/026* (2013.01); *B01F 15/0248* (2013.01); *B01F 15/0458* (2013.01); *B01F 15/065* (2013.01); *B01J 8/10* (2013.01); *B01J 19/0066* (2013.01); *B01J 19/1806* (2013.01); *C01G 53/006* (2013.01); *B01F 2015/061* (2013.01); *B01F 2015/062* (2013.01); *B01J 2208/00212* (2013.01); *B01J 2208/00539* (2013.01); *B01J 2219/00094* (2013.01); *B01J 2219/00162* (2013.01); *B01J 2219/00761* (2013.01); *H01M 4/505* (2013.01); *H01M 4/525* (2013.01)

(58) Field of Classification Search
CPC .. B01F 15/026; B01F 15/0458; B01F 15/065; B01F 2015/061; B01F 2015/062; B01J 19/18; B01J 8/10; B01J 19/0066; B01J 19/1806; B01J 2208/00212; B01J 2208/00539; B01J 2219/00094; B01J 2219/00162; B01J 2219/00761; C01G 53/006; H01M 4/505; H01M 4/525
USPC .......................................................... 366/149
See application file for complete search history.

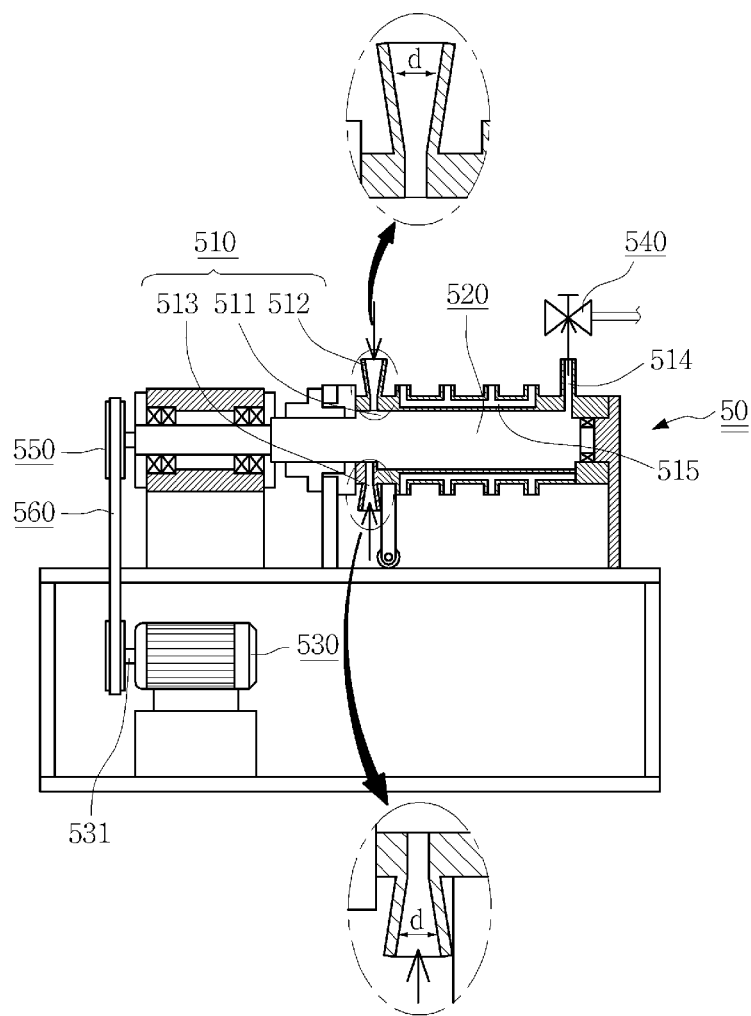
[Fig.1]

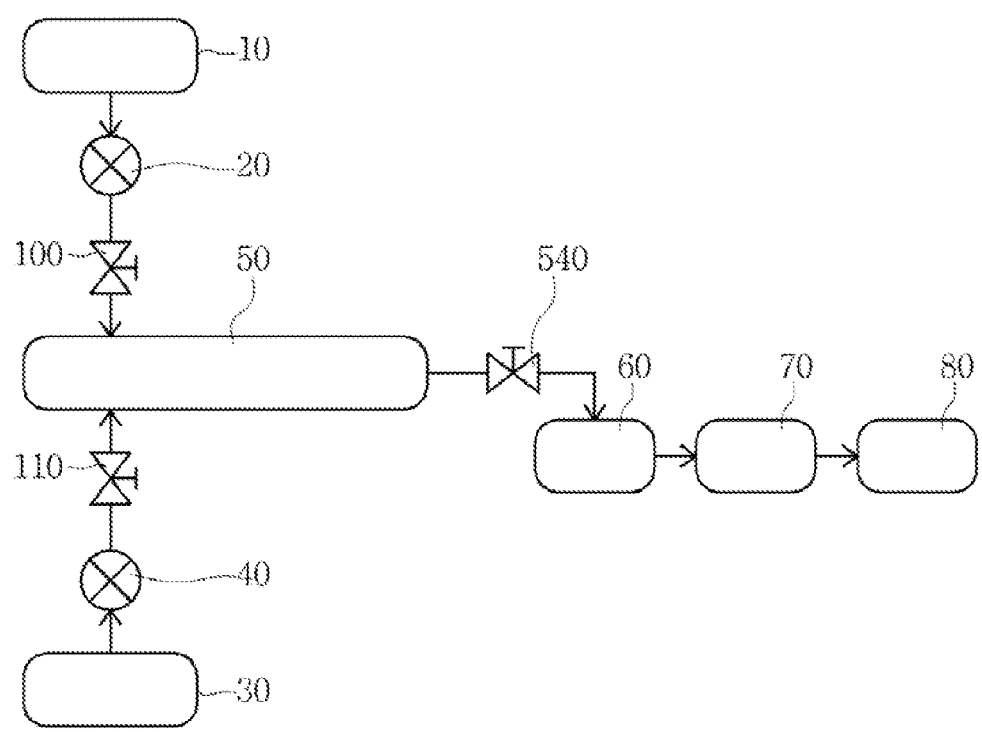
[Fig.2]

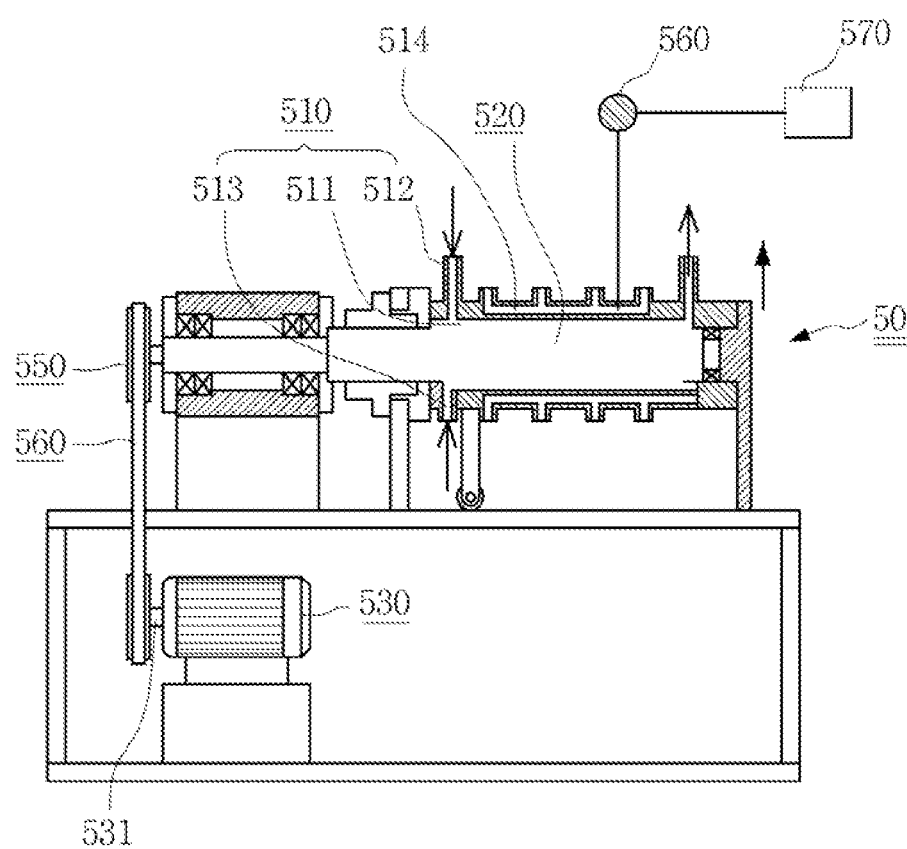
[Fig.3]

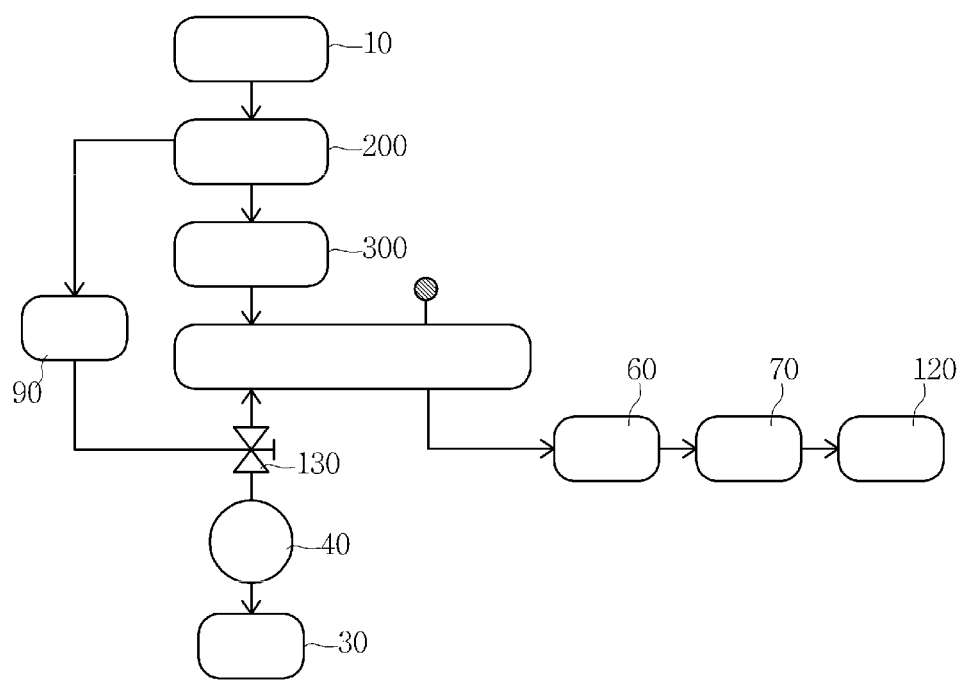
[Fig.4]

[FIG.5]
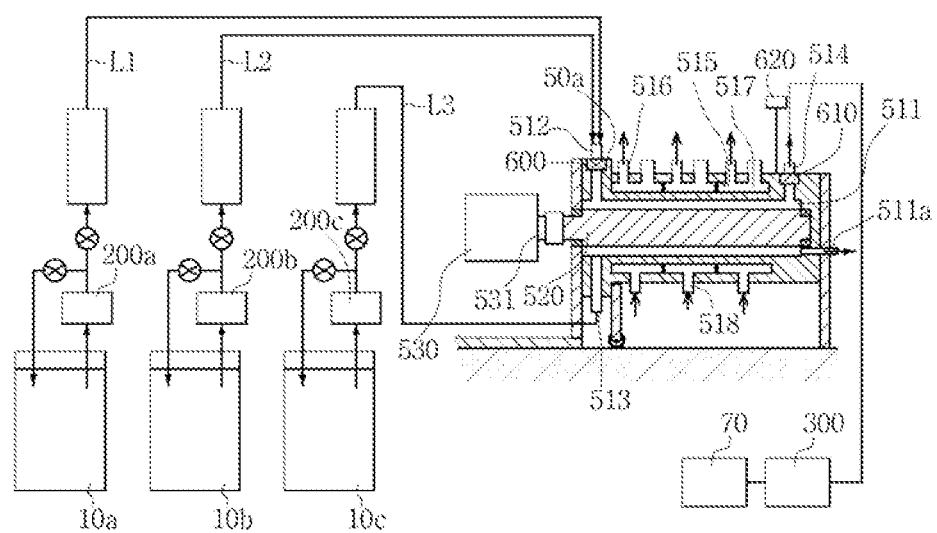

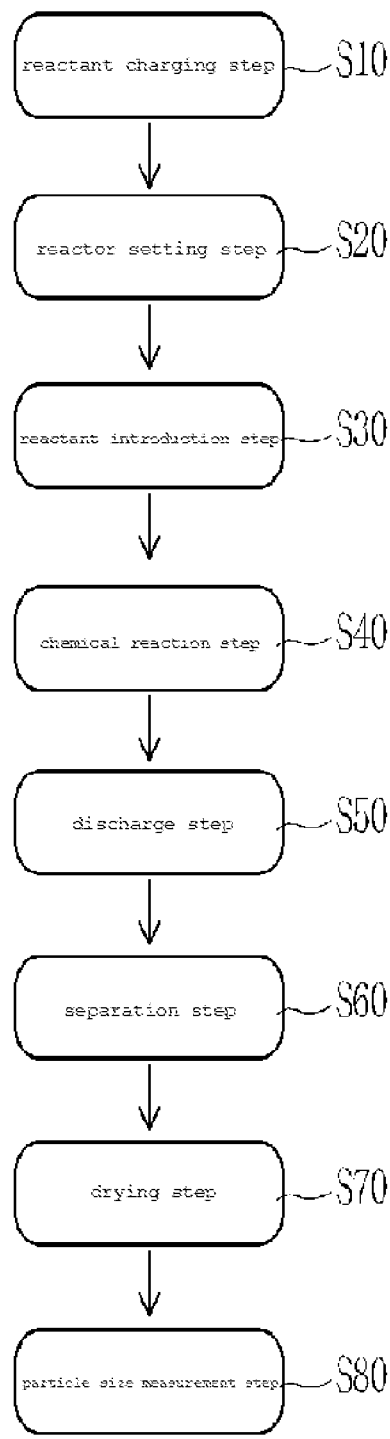
[FIG.6]

REACTION DEVICE FOR MIXING AND MANUFACTURING METHOD USING THE REACTION DEVICE

RELATED APPLICATIONS

This application is a § 371 application from PCT/KR2013/010605 filed Nov. 21, 2013, which claims priority from Korean Patent Application No. 10-2012-0134923 filed Nov. 27, 2012 and No. 10-2012-0156969 filed Dec. 28, 2012, each of which is herein incorporated by reference in its entirety.

TECHNICAL FIELD

The present invention relates to a reaction apparatus, and more particularly, to a reaction apparatus capable of performing solid-liquid mixing or gas-liquid mixing using Taylor vortices.

BACKGROUND ART

Regarding a conventional gas hydrate reactor, water from a water supply unit and gas from a gas supply unit are supplied and mixed in a mixing chamber, and the mixture is introduced into the reactor. The reactor generally needs to be maintained at high pressure and low temperature, although the temperature and pressure in the reactor somewhat vary depending on the conditions in which gas hydrate is formed. Herein, the pressure in the reactor is controlled by the supply of gas, and the temperature in the reactor is controlled by controlling the temperature of a water bath. Particularly, the temperature of the water bath needs to be significantly low in order to maintain the reactor at low temperature.

Meanwhile, a stirrer may be used to promote gas hydrate formation, and the formed gas hydrate is stored in a gas hydrate storage unit.

The conventional gas hydrate reactor as described above has the following problems. Specifically, because the conventional gas hydrate reactor is located in a water bath, it is very difficult to accurately and quickly control the temperature of the internal space of the reactor in which gas hydrate is produced. Moreover, because water is filled into the water bath, it is difficult to precisely control the temperature of the water, due to the thermodynamic inertia of the water. Even if the temperature of water in the water bath is precisely controlled, it is difficult to quickly and accurately control the internal temperature of the reactor, because the internal temperature of the reactor is influenced directly by the temperature of the water bath.

In addition, the inside of the reactor needs to be maintained at high temperature depending on the conditions in which gas hydrate is produced, and thus it is not easy to introduce gas into this high-temperature reactor. Additionally, because the rate of reaction between gas and water is low, the rate of production of gas hydrate is low.

OBJECT AND SUMMARY OF THE INVENTION

The present invention has been made in view of the above-described problems occurring in the prior art, and it is an object of the present invention to provide a reaction apparatus which can perform a compression function without having to use expensive heating means so as to make it possible to simplify the structure, enables the easy introduction of gas and water into the reactor, can increase the rate of production of gas hydrate by using micro-mixing based on Taylor flow, and can continuously produce gas hydrate.

Another object of the present invention is to provide a reaction apparatus for solid-liquid mixing, which can simply and easily produce a reaction product in a high yield through a series of processes by mixing and reacting a solid phase material with a solution using Taylor flow, and can reduce the reaction time compared to those required in conventional reaction apparatuses.

In order to accomplish the above objects, the present invention provides a reaction apparatus comprising: first and second reactant storage units, each configured to store any one of a solid reactant, a gaseous reactant and a liquid reactant; pumps configured to pump the reactants stored in one or more of the first and second reactant storage units; and a reactor configured to mix the reactants pumped by the pumps, in which the reactor comprises: a cylinder which includes a reaction chamber configured to receive the reactants, and has inlet ports provided at the upper and lower sides, respectively, and connected to the first and second reactant storage units, respectively; a stirring shaft disposed rotatably in the cylinder and configured to stir the reactants supplied from the first and second reactant storage units; and a stirring motor configured to provide a rotational force to the stirring shaft.

According to the present invention, using pumps, disposed at the inlet port side of a reactor, and a pressure control valve, a reaction product such as gas hydrate can be easily compressed with a suitable pressure, and gas and water for forming gas hydrate can be easily mixed with each other.

In addition, using pumps, reactants such as gas and water can be easily introduced into a high-pressure reactor, and using a pressure control valve, the internal pressure of the reactor can be easily increased.

In another embodiment in which a solid material and a solution are mixed and reacted with each other, the reaction time can be reduced, and a reaction product having a uniform particle size distribution can be produced in a simple, easy and quick manner. A superior product can be produced with high productivity.

DESCRIPTION OF DRAWINGS

FIG. 1 is a cross-sectional view showing an example of a reactor that is applied to a reaction apparatus according to the present invention.

FIG. 2 is a block diagram showing the overall structure of a reaction apparatus according to the present invention.

FIG. 3 is a cross-sectional view showing another example of a reactor that is applied to a reaction apparatus according to the present invention.

FIG. 4 is a block diagram showing the overall structure of another example of a reaction apparatus according to the present invention.

FIG. 5 is a cross-sectional view showing still another example of a reactor that is applied to a reaction apparatus according to the present invention.

FIG. 6 is a flow chart showing a process of preparing a positive electrode active material for a lithium secondary battery using the reactor of FIG. 5.

DETAILED DESCRIPTION OF THE EMBODIMENTS

Hereinafter, preferred embodiments of the present invention will be described in detail.

The present invention provides a reaction apparatus comprising: first and second reactant storage units 10 and 30, each configured to store any one of a solid reactant, a liquid reactant and a gaseous reactant; pumps 20 and 40 configured to pump the reactants stored in one or more of the first and second reactant storage units 10 and 30; and a reactor 50 configured to mix the reactants fed by the pumps 20 and 40, wherein the reactor 50 comprises: a cylinder 510 which includes a reaction chamber 511 configured to receive the reactants, and has inlet ports 512 and 513 provided at the upper and lower sides and connected to the first and second reactant storage units, respectively; a stirring shaft 520 disposed rotatably in the cylinder 510 and configured to stir the reactants supplied from the first and second reactant storage units; and a stirring motor 530 configured to provide a rotational force to the stirring shaft 520.

The reaction apparatus according to the present invention may comprise a reactant supply unit composed of reactant storage units and pumps, a reactor, and a post-treatment unit configured to post-treat a mixture that passed through the reactor. For example, as described in embodiments below, the reaction apparatus comprises a supply unit, a reactor and a post-treatment unit, in order to produce gas hydrate, electronic paper or a positive electrode active material for a lithium secondary battery.

Embodiment 1

A first embodiment of the present invention is a reaction apparatus for producing gas hydrate. The reaction apparatus comprises a first reactant storage unit 10, a first reactant pump 20, a second reactant storage unit 30, a second reactant pump 40, and a reactor. In addition, the reaction apparatus comprises, as post-treatment units, a water removal unit 60 and a dryer 70.

The first reactant storage unit 10 stores any one reactant selected from among water and gas, when the reaction apparatus is used to gas hydrate as described in the present invention. When gas is stored in the first reactant storage unit 10, it is essential to maintain the first reactant storage unit 10 in an airtight state in order to prevent gas leakage. The first reactant pump 20 serves to pump the first reactant from the first reactant storage unit 10 into the reactor 50 at high pressure.

The pump 20 for pumping the first reactant preferably has a pumping pressure of 2 bar or higher, more preferably 5-50 bar. Because the pump 20 for pumping the first reactant has a high pumping pressure as described above, the first reactant can be easily introduced into the reactor 50, even when the internal pressure of the reactor 50 increases, unlike the prior art. If gas is stored in the first reactant storage unit 10, water may be stored in the second reactant storage unit 30. In this case, any phase selected from among a solid phase, a gas phase and a liquid phase may be stored in the first reactant storage unit 10, but only a liquid phase is stored in the second reactant storage unit 30. The pump 40 for pumping the second reactant is equal or similar to the pump 20 for pumping the first reactant.

Meanwhile, a first check valve 100 and a second check valve 110 may be disposed between the reactor 50 and the first reactant pump 20 and between the reactor 50 and the second reactant pump 40, respectively. The check valves 100 and 110 are configured to prevent the reactants from flowing backward, and may be one-way valves.

The reactor 50 according to the present invention comprises a cylinder 510, a stirring shaft 520, a stirring motor 530 and a pressure control valve 540.

The cylinder 510 includes a reaction chamber 511 in which the first and second reactants are introduced and mixed. At the upper side of the cylinder 510, a first inlet port 512 configured to introduce any one of the first and second reactants into the reactor chamber 511 is formed, and at the lower side of the cylinder 510, a second inlet port 513 configured to introduce the other one of the first and second reactants into the reactor chamber 511 is formed. In addition, at one side of the cylinder 510, an outlet port 514 configured to discharge a mixture of the first and second reactants is formed.

Herein, the first and second inlet ports 512 and 513 preferably have a Venturi tube shape whose inner diameter "d" decreases gradually toward the inside of the reactor 50. When the inlet ports have this shape, the first and second reactants that passed through the inlet ports 512 and 513, respectively, can be more easily introduced into the reaction chamber 511. When the inner diameter of each of the inlet ports 512 and 513 decreases gradually, the flow rate of each of the reactants will increase according to the Bernoulli's theorem, and thus each of the reactants can be more easily introduced into the reaction chamber 511.

The stirring shaft 520 is rotatably disposed in the cylinder 510 in the same transverse direction as that of the cylinder 510 so that it can stir the first and second reactants.

The stirring motor 530 may be connected directly or indirectly to the stirring shaft 520. In the latter case, the reactor may further comprise a belt pulley 550 and a belt 560, which connect the shaft 531 of the stirring motor 530 to one end of the stirring shaft 520 so as to transfer the power of the stirring motor 530 to the stirring motor 520.

The pressure control valve 540 is disposed above the outlet 514, and serves to control the internal pressure of the reaction chamber 511. Specifically, the pressure control valve 540 serves to control the internal pressure of the reaction chamber 511 by controlling the opening extent or closing of the outlet 514. For example, if the pressure control valve 540 is opened to a small extent or closed, the internal pressure of the reaction chamber 511 will increase, and if the pressure control valve 540 is opened to a relatively great extent, the internal pressure of the reaction chamber 511 will decrease.

Meanwhile, if a reaction product to be produced in the reactor 50 is gas hydrate, the reactor generally needs to be maintained at high pressure and low temperature, although the temperature and pressure in the reactor somewhat vary depending on the conditions in which gas hydrate is formed. In this case, the pressure in the high-temperature reactor 50 is controlled by the supply of gas, and the temperature in the reactor is controlled by a cooling chamber 515.

In other words, the cooling chamber 515 through which a refrigerant is circulated is disposed around the reaction chamber 511 so that the temperature of the first and second reactants in the reaction chamber 511 can be controlled at low temperature.

In this reactor 50, the first and second reactants to be mixed with each other are introduced into the reaction chamber 511 through the first and second inlet ports 512 and 513. Specifically, the first reactant is pumped into the first inlet port 512 by the first reactant pump 200 connected to the first inlet port, and the second reactant is pumped into the second inlet port 513 by the pump 400 connected to the second inlet port. In addition, the opening extent or closing of the outlet port 514 of the reaction chamber 511 is controlled by the pressure control valve 540 so that the internal pressure of the reaction chamber 511 will increase to compress the reactants.

In addition, when the stirring shaft 520 is rotated, the reactants in the reaction chamber 511 form a flow. If the angular velocity of the stirring shaft 520 is low, laminar Taylor flow will be formed, whereas, as the angular velocity increases, the reactants tend to move along the inner circumferential surface of the reaction chamber 511, and thus the reactants become unstable, and Taylor vortices occur at a specific critical velocity. The Taylor vortices are arranged in a very regular ring shape, and rotate in opposite directions so that they are not mixed with one another in an axial direction, thereby inducing uniform mixing.

Meanwhile, the stirring motor 530 is a variable speed motor whose speed is controllable. Thus, the rotating speed of the stirring shaft 520 can be easily controlled so that shear stress that is applied to the reactants during the reaction can be controlled to control the size of the reactant particles. In addition, the stirring shaft 520 can be rotated at high speed compared to a stirring method, and thus high shear stress can be transferred to the reactants, thereby reducing the reaction time. Although the foregoing has been described with respect to the continuous reactor, the above description may also be applied to a batch-type reactor.

The water removal unit 60 is disposed at the side of the outlet port 514 through which the mixed and compressed reaction product is discharged from the high-pressure reactor 50. The water removal unit 60 is configured to remove water from the reaction product discharged from the high-pressure reactor 50, and may be, for example, a centrifugal hydroextractor or concentrator that can separate liquid from the slurry-type reaction product.

Regarding the centrifugal hydroextractor, the slurry-type reaction product is introduced into a dehydration bin having a plurality of fine perforated holes formed through the sidewall thereof, and then when the dehydration bin is rotated at high speed, water is discharged through the fine holes by a centrifugal force, and only the dehydrated reaction product remains in the dehydration bin.

The dryer 70 is disposed downstream of the water removal unit 60, and serves to completely dry the water-free reaction product. Because the reaction product dehydrated by the water removal unit 60 has a high water content, hot air can be blown to the reaction product by, for example, a hot air dryer, to reduce the water content of the reaction product to 10% or less, thereby obtaining the reaction product with high purity.

Meanwhile, a crushing unit 80 is disposed downstream of the dryer 70, and serves to finely crush the dried reaction product to a desired size. The crushing unit 80 may comprise, for example, two opposite crushing screws that are rotatable in opposite directions. When the reaction product is introduced between the two crushing screws, it is crushed between the two crushing screws.

Embodiment 2

FIGS. 3 and 4 show a reaction apparatus of the present invention, which is used to perform liquid-solid mixing. Particularly, the reaction apparatus is used to coat nanoparticles in the production of electronic paper so that the nanoparticles will not agglomerate in microcapsules and will have high mobility. When this reaction apparatus is used, the reaction time can be reduced.

As shown in FIGS. 3 and 4, the reaction apparatus for solid-liquid mixing according to the present invention comprises a solid material storage unit 10 corresponding to the first reactant storage unit, a solid material metering unit 200, a feeder 300, a solution storage unit 30 corresponding to the second reactant storage unit, a pump 40, a reactor 50, a water removal unit 60, and a dryer 70, which are arranged according to the order of processes.

The reaction apparatus of embodiment 2 differs from the reaction apparatus of embodiment 1 in that a solid material is stored in the first reactant storage unit, and the reaction apparatus comprises a metering unit and a feeder corresponding to the pump.

Among the above units, the solid material storage unit 10 serves to store a powdery solid material. The solid material storage unit 10 may have various configurations such as a tank or a hopper.

The solid material metering unit 200 serves to meter a predetermined amount of the solid material automatically or manually discharged from the solid material storage unit 10 and to transfer the metered solid material to the feeder 300. Herein, the solid material metering unit 200 may be, for example, a load cell or the like, but is not limited thereto. Further, the amount of the solid material to be metered by the solid material metering unit 200 can be electronically and automatically controlled by a control unit 90.

The feeder 300 serves to automatically feed the metered solid material from the solid material storage unit 10 to the reactor 50, and may have various configurations such as a belt conveyor, a rotary type device (water mill) or a screw-type device.

The solution storage unit 30 serves to store a liquid solution. The solution storage unit 30 may be composed of a tank or a hopper, like the solid material storage unit 10.

The pump 40 serves to introduce the solution from the solution storage unit 30 into the reactor 50 so as to be in proportion to the amount of the solid material. Between the pump 40 and the reactor 50 for mixing, a flow control valve for controlling the flow rate of the solution may be disposed. The flow control valve 130 is preferably composed of an electronic valve that is electronically and automatically controlled by the control unit 90 so as to make the feed of the solid material proportional to the feed of the solution.

The reactor 50 is based on the use of Taylor flow, like the reactor of embodiment 1, and serves to mix the solution with the solid material according to this principle.

Specifically, the reactor 50 includes a reaction chamber 511 configured to receive the solid material and the solution, and a horizontal cylinder 510. At the upper side of the cylinder 510, a solid material inlet port configured to introduce the solid material into the reaction chamber 511 is formed, and at the lower side of the cylinder 510, a solution inlet port 513 configured to introduce the solution into the reaction chamber 511 is formed.

The reactor 50 includes a horizontal stirring shaft 520 disposed rotatably in the cylinder 510 and configured to mix the solution with the solid material particles.

The reactor 50 has a stirring motor 530. The stirring motor 530 may be connected directly or indirectly to the stirring shaft 530. In the latter case, the reactor may further comprise a belt pulley 540 and a belt 550, which connect the shaft 531 of the stirring motor 530 to one end of the stirring shaft 520 so as to transfer the power of the stirring motor 530 to the stirring motor 520.

When the solid material and the solution to be mixed are introduced into the reaction chamber 511 of the reactor 50 through the solid material inlet port 512 and the solution inlet port 513 and the stirring shaft 520 is rotated, a flow is formed. Specifically, if the angular velocity of the stirring shaft 520 is low, laminar Taylor flow will be formed, whereas, as the angular velocity increases, the fluid tend to move along the inner circumferential surface of the reaction chamber 511, and thus the fluid becomes unstable, and Taylor vortices occur at a specific critical velocity. The Taylor vortices are arranged in a very regular ring shape, and rotate in opposite directions so that they are not mixed with one another in an axial direction, thereby inducing uniform mixing. However, the solid material may be a polymer, a metal, a metal oxide or the like.

Meanwhile, the stirring motor 530 is a variable speed motor whose speed is controllable. Thus, the rotating speed of the stirring shaft 520 can be easily controlled so that shear stress that is applied to the reactants during the reaction can be controlled to control the size of the reactant particles. In addition, the stirring shaft 520 can be rotated at high speed compared to a stirring method, and thus high shear stress can be transferred to the reactants, thereby reducing the reaction time.

In the continuous reactor 50 in which a continuous reaction that forms Taylor flow can be carried out, a heating medium-packed chamber 514 is provided around the reaction chamber 511 in order to control the internal temperature of the reaction chamber 511. To accurately and automatically control the temperature of the reactor, the reactor may further comprise a temperature sensor 560 configured to sense the internal temperature of the heating medium-packed chamber 514 or the reaction chamber 511, and a temperature control unit 570 configured to sense, in real time, the temperature data sensed by the temperature sensor 560, and to increase or reduce the temperature or maintain the temperature at a constant level.

Particularly, the heating medium that is packed in the heating medium-packed chamber 514 is oil when the internal temperature of the reactor is to be maintained at 100° C. or higher, and is water when the internal temperature is to be maintained at 100° C. or lower. This heating medium-packed chamber 514 serves to increase the internal temperature of the reaction chamber 511 so as to evaporate a portion of water from the reactants.

The water removal unit 60 is connected to the outlet of the reactor 50, through which the reaction product is discharged from the reactor 50. It serves to remove water from the reaction product discharged from the reactor 50 for mixing, and may be, for example, a centrifugal hydroextractor or concentrator that can separate liquid from the slurry-type reaction product.

Regarding the centrifugal hydroextractor, the slurry-type reaction product is introduced into a dehydration bin having a plurality of fine perforated holes formed through the sidewall thereof, and then when the dehydration bin is rotated at high speed, water is discharged through the fine holes by a centrifugal force, and only the dehydrated reaction product remains in the dehydration bin.

Meanwhile, the concentrator serves to evaporate water from the reaction product to concentrate the reaction product. When the reaction product is introduced into a heating furnace of the concentrator and the heating furnace is heated to a suitable temperature, water is evaporated from the reaction product so that only the concentrated reaction product remains.

The dryer 70 is disposed downstream of the water removal unit 60, and serves to completely dry the water-free reaction product. Because the reaction product dehydrated by the water removal unit 60 has a high water content, hot air can be blown to the reaction product by, for example, a hot air dryer, to reduce the water content of the reaction product to 10% or less, thereby obtaining the reaction product with high purity.

Meanwhile, a crushing unit 80 is disposed downstream of the dryer 70, and serves to finely crush the dried reaction product to a desired size. The crushing unit 80 may comprise, for example, two opposite crushing screws that are rotatable in opposite directions. When the reaction product is introduced between the two crushing screws, it is crushed between the two crushing screws.

Embodiment 3

A reaction apparatus according to the present invention may be used to prepare a positive electrode active material for a lithium secondary battery. The structure of the reaction apparatus of the present invention, which is used to prepare a positive electrode active material, is equal or similar to the reactor of embodiment 1 or 2, except that it comprises three supply units, and a post-treatment unit comprises a separator 300 and a dryer.

As shown in FIGS. 5 and 6, the reactor comprises: a non-rotating type reaction furnace 500a including a reaction chamber 511; a stirring motor 530 disposed at one side of the reaction furnace 500a; and a stirring shaft 520 connected to the motor shaft 531 of the stirring motor 530 and included in the reaction chamber 511 so as to be spaced apart from the inner wall of the reaction chamber 511.

In addition, the reactor comprises: one or more reactant inlet ports 512 and 513 formed to communicate with the reaction chamber 511 and configured to introduce reactants into the reaction chamber; a reaction product outlet port 514 formed to communicate with the reaction chamber 511 and configured to discharge a reaction product from the reaction chamber; and a plurality of extra ports 516 provided between the inlet ports 512 and 513 and the reaction product outlet port 514 so as to communicate with the reaction chamber 511.

In addition, the reactor comprises a ring-shaped packed chamber 515 provided around the reaction chamber 511, in which the packed chamber 151 is packed with hot water. In addition, the reactor may further comprise: a particle crushing unit 600 disposed in the channel of the reactant inlet ports 512 and 513 and configured to crush the reactant particles introduced through the reactant inlet ports; a flow sensor 610 disposed in at least one of the reactant inlet ports, the reaction product outlet port and the extra ports 516 (connected to the packed chamber 515) and configured to sense the flow rate of the reactants; and a flow control unit configured to control the flow rate of the reactants, introduced through the reactant inlet ports 512 and 513, based on flow rate data sensed by the flow sensor 610.

In addition, the reaction apparatus may further comprise: a plurality of reactant storage units 10a, 10b and 10c connected to the inlet ports 512 and 513 by connection lines L1, L2 and L3; supply pumps 200 disposed in the connection lines L1, L2 and L3 and configured to pump the reactants from the reactant storage units 10a, 10b and 10c into the reaction chamber 511 of the all-in-one type reactor; a positive electrode active material separator 300 connected to the reaction product outlet port 514 and configured to separate a positive electrode active material from the slurry-type reaction product discharged through the reaction product outlet port 514; and a dryer 70 connected to the positive electrode active material separator 300 and configured to dry the positive electrode active material separated from the positive electrode active material separator 300.

Hereinafter, a process of preparing a positive electrode active material for a lithium secondary battery using the reaction apparatus of the present invention will be described.

Step 1 (S10)

Step 1 is a reactant charging step. A first to third reservoir tank corresponding to the reactant storage units 10a, 10b and 10c connected to the reactor are provided. An aqueous metal solution containing nickel sulfate ($NiSO_4$), manganese sulfate ($MnSO_4$) and cobalt sulfate ($CoSO_4$) mixed at a molar ratio of 1:1:1, 5:2:3, 5:3:2 or 7:2:1 is charged into the first reservoir tank. In addition, ammonia gas ($NH_3$) and sodium hydroxide (NaOH) are charged into the second reservoir tank and the third reservoir tank, respectively. It should be noted that ammonia gas is used in place of ammonia water used in the prior art. Ammonia gas is introduced into the reaction furnace of the reactor together with an aqueous metal solution and a sodium hydroxide solution, enables the production of small particles, and thus has a high energy density per volume.

Herein, the concentration of metals in the aqueous metal solution is preferably 2-4 M, and the concentration of sodium hydroxide in the sodium hydroxide solution is preferably 5-6 M. Such limited concentrations are the optimum conditions in which the crystallinity of the positive electrode active material is increased and the positive electrode active material is stabilized.

Step 2 (S20)

Step 2 is a reactor setting step. In this step, the internal pressure of the chamber provided in the reactor is set at 1-2 bar, and the temperature of the reaction furnace is maintained at a temperature between room temperature and 80° C. by the packed chamber. In the above internal pressure range, a suitable pressure is applied to the reactants introduced into the chamber so as to provide the optimal reaction effect. Also, the above chamber temperature is selected because the produced cobalt hydroxide precipitates as a complex at low temperatures, making it difficult to obtain a high-density composite hydroxide.

Step 3 (S30)

Step 3 is a reactant introduction step. Specifically, pumps are disposed at the outlet sides of the first reservoir tank and the third reservoir tank, and an electronic valve or a manual valve is disposed at the outlet side of the second reservoir tank. The contents in the first and third reservoir tanks are introduced into the reaction furnace through transport pipes by the operation of the pumps, and the gaseous content in the second reservoir tank is introduced into the chamber through a connection line by the opening of the valve (electronic valve or manual valve).

In the inlet of the chamber into which the reactants are introduced, a pH sensor is disposed so that the pH of the introduced reactants can be sensed. When the sensed pH is lower than the set pH, sodium hydroxide continues to be introduced, and when the sensed pH reaches the set pH, the introduction of sodium hydroxide is blocked, thereby controlling the pH of the reactants. Herein, the pH is preferably 10.8-12.5.

Step 4 (S40)

Step 4 is a chemical reaction step. Specifically, the aqueous metal solution, ammonia gas and sodium hydroxide introduced into the chamber are stirred by the rotation of the stirring shaft at a speed of 1 rpm or higher (preferably 100-1500 rpm) for 30 minutes or more so that a chemical reaction between the introduced gas-liquid reactants occurs. Herein, the chamber is a closed-type chamber in which a gas-liquid reaction can be carried out. In the case of an open-type reaction chamber that is used in the prior art, gas is difficult to reside in the reaction chamber, because gas leaks to the outside of the reaction chamber. Thus, it is impossible to carry out a liquid-liquid reaction in the reaction chamber according to the prior art. Table 1 below shows a comparison between a conventional batch-type reactor and the gas-liquid reactor of the present invention.

TABLE 1

|  | Batch-type reactor | Gas-liquid reactor |
| --- | --- | --- |
| Fluid mixing method | Macro-mixing | Micro-mixing |
| Production process | Discontinuous | Continuous |
| Mass transfer rate (m/s) | 1 | 3.3 |
| Stirring intensity (w/kg) | 0.8 | 5.8 |
| Process time (hr) | 12-24 | 3-6 |
| Particle distribution (CV %) | 30-50 | 20 or less |

As can be seen in Table 1 above, the gas-liquid reactor exhibits excellent characteristics compared to the batch-type reactor. Thus, the method of preparing a positive electrode active material using the gas-liquid reactor according to the present invention is highly efficient compared to conventional methods and enables a gas-liquid reaction to be carried out. In addition, because ammonia gas is used as described above, energy density can be increased, and waste liquid can be reduced.

Step 5 (S50)

Step 5 is a discharge step. Specifically, after completion of a chemical reaction between the reactants, a slurry-type reaction product is discharged through the outlet port of the reaction furnace.

Step 6 (S60)

Step 6 is a separation step. Specifically, because the discharged reaction product contains water, it is dehydrated by a separator or a dehydration device to separate liquid from the positive electrode active material. Herein, the amount of the liquid in the present invention is significantly reduced compared to that in the prior art, because ammonia gas is used in place of ammonia water. The liquid is liquid waste, and the process can be more environmentally friendly by reducing the amount of the liquid waste.

Step 7 (S70)

Step 7 is a drying step. Specifically, the positive electrode active material recovered in step 6 is dried in a drying unit at a temperature between 110° C. and 130° C. for 24 hours or more to obtain a powdery positive electrode active material.

Step 8 (S80)

Step 8 is a particle size measurement step. Specifically, the particle size distribution and particle size of the powdery positive electrode active material is measured using a scanning electron microscope. The results of the measurement indicated that the positive electrode active material had a uniform particle size distribution with an average particle size of 8 μm or less. The reason why the particle size was reduced compared to that in the prior art is that ammonia gas was used in place of ammonia water. Due to the reduced particle size, the uniformity of the particle size distribution was improved. Thus, when the positive electrode active material is used in a lithium secondary battery, the life span of the battery will be increased.

INDUSTRIAL APPLICABILITY

As described above, the reaction apparatus for mixing according to the present invention can produce a product by selectively mixing solid, liquid and/or gaseous reactants and applying pressure thereto. For example, the reaction apparatus according to the present invention can be used for the production of a positive electrode active material for a lithium secondary battery, as well as gas hydrate or electronic paper.

The invention claimed is:

1. A reaction apparatus for mixing, comprising:
   two or more reactant storage units, each configured to store any one of a solid reactant, a gaseous reactant and a liquid reactant;
   two or more pumps configured to pump the reactants stored in two or more of the reactant storage units; and
   a reactor configured to mix the reactants pumped by the pumps and comprising:
   a stirring shaft disposed rotatably in a cylinder and configured to stir the reactants supplied from the reactant storage units;
   the cylinder comprises a reaction chamber configured to receive the reactants, and has inlet ports provided at upper and lower sides thereof, respectively, and connected to the reactant storage units, respectively, such that the reactants from the reactant storage units are supplied at opposing sides of the stirring shaft;
   a stirring motor configured to provide a rotational force to the stirring shaft; and
   a packed chamber disposed around the reaction chamber and through which a heating medium or a refrigerant circulates, the packed chamber being configured to increase or reduce an internal temperature of the reaction chamber wherein one of the reaction products comprises water and further comprising a water removal unit disposed at an outlet side through which a reaction product produced by mixing of the reactants in the reactor is discharged, and configured to remove water from the reaction product discharged from the reactor wherein the water removal unit is a centrifugal hydroextractor or a concentrator.

2. The reaction apparatus of claim 1, further comprising a check valve disposed between the reactor and the pumps.

3. The reaction apparatus of claim 1, wherein the solid reactant is stored in a first reactant storage unit; and the reaction apparatus further comprises, between the first reactant storage unit and the reactor, a metering unit configured to meter and feed the solid reactant, and a feeder configured to feed the reactant to the reactor, and between a second reactant storage unit and the reactor, a pump and a flow control valve.

4. The reaction apparatus of claim 3, wherein the metering unit comprises a load cell.

5. The reaction apparatus of claim 3, wherein the metering unit comprises a control unit configured to electronically control a degree of metering.

6. The reaction apparatus of claim 1, further comprising a flow control valve disposed between the pumps and the reactor, in which a degree of opening of the flow control valve is electronically controlled by a control unit.

7. The reaction apparatus of claim 1, wherein the inlet ports have a Venturi tube shape whose inner diameter gradually decreases toward inside of the reactor.

8. The reaction apparatus of claim 1, further comprising a pressure control valve disposed above an outlet port of the reactor and configured to control an internal temperature of the reaction chamber.

* * * * *